(12) United States Patent
Zackrisson et al.

(10) Patent No.: US 6,357,324 B1
(45) Date of Patent: Mar. 19, 2002

(54) WORKPIECE MACHINING PROCESS AND A NUMERICALLY CONTROLLED LATHE

(75) Inventors: Erling Zackrisson, Göteborg; Franco Caldana, Lidkoeping, both of (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 09/476,670

(22) Filed: Dec. 30, 1999

(30) Foreign Application Priority Data

Dec. 30, 1998 (IT) .......................... TO98A1104

(51) Int. Cl.⁷ .............................. B23B 1/00; B23B 3/30
(52) U.S. Cl. ...................... 82/1.11; 82/124; 82/127; 82/129
(58) Field of Search ................ 82/1.11, 124, 125, 82/126, 127, 129, 120

(56) References Cited

U.S. PATENT DOCUMENTS

| | | | |
|---|---|---|---|
| 4,207,657 A | * 6/1980 | Wagner | 29/33 T |
| 4,301,581 A | 11/1981 | Bader et al. | |
| 5,020,402 A | * 6/1991 | Link et al. | 82/124 |
| 5,174,071 A | * 12/1992 | Tammasini | 82/125 X |
| 5,222,285 A | * 6/1993 | Horikawa | 82/124 X |
| 5,655,423 A | * 8/1997 | Nishio et al. | 82/1.11 |
| 5,704,262 A | * 1/1998 | Baumbusch et al. | 82/124 |
| 5,904,082 A | * 5/1999 | Link et al. | 82/129 |

FOREIGN PATENT DOCUMENTS

| | | |
|---|---|---|
| DE | 212 447 | 12/1982 |
| DE | 195 26 900 | 7/1995 |
| EP | 0 433 722 | 11/1990 |
| EP | 0 453 710 | 1/1991 |

* cited by examiner

Primary Examiner—Henry Tsai
(74) Attorney, Agent, or Firm—Merchant & Gould P.C.

(57) ABSTRACT

A number of annular or short tubular elements are obtained from an elongate tube having a length calculated as a multiple of the length of the elements. A tube is automatically transferred into a chuck of a twin-spindle lathe to turn the inner bore of an end portion of the tube. The end portion is then cut off the tube, thereby obtaining an annular element. The element is automatically reversed and fitted to a mandrel for turning its outer surface and its end where the cutting was performed. The so finished or partly-finished element is then automatically delivered to an outfeed conveyor. Such a sequence is repeated cyclically until the last portion of the tube is processed, leaving no waste tips of the tube. A numerically controlled lathe for performing the process is also disclosed.

18 Claims, 7 Drawing Sheets

WORKPIECE MACHINING PROCESS AND A NUMERICALLY CONTROLLED LATHE

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention refers to a workpiece machining process and a numerically controlled lathe, particularly for performing said process.

2. Description of the Related Art

In conventional processes for machining workpieces of substantially annular or short tubular shape, such as races for rolling contact bearings, blanks are fed one by one to a lathe to be turned to a desired shape. The blanks are either forged or, in some instances, pieces cut in small lengths from a tube.

The cutting of the tubes requires an expenditure of time and costs concerning the tube cutting machines, resulting in an increase of manufacturing cost. Another inconvenience encountered with the cutting of tubes in small lengths prior to their feeding to the lathe concerns waste, as at least 3 to 5% scrap is left from the tube cutting operations.

In the industry there is an ever increasing demand for numerically controlled automatic lathes adapted to machine low, medium and high volume production. As known, low volume production requires frequent resetting of the automatic machine in passing from one kind of workpiece to another, whilst high volume production machines are generally scarcely flexible as being specifically designed for a certain product.

BRIEF SUMMARY OF THE INVENTION

Against the foregoing background, it is an object of the present invention to provide a numerically controlled lathe capable of machining indifferently forged blanks or tubes to be cut in a plurality of pieces, thereby avoiding the above discussed prior art inconveniences.

It is an object of the present invention to provide a numerically controlled lathe being flexible to deal with low, medium or high volume production, and easy to reset in passing from one kind of workpiece to another.

To meet these and other objects, the invention provides, according to a first aspect, a numerically controlled lathe including a single drum having at least two spindles, the drum being rotatably mounted about a drum axis for selectively moving said spindles between at least a first operational spindle location and a second operational spindle location. The lathe includes at least one toolholder turret with at least one turning tool positionable in working relation to a workpiece retained at one of said spindles at one of said first and second spindle locations. The lathe also includes a workpiece feeding station at one side of the lathe, equipped with a first mechanism for feeding elongate blanks in form of tubes or bars and a second mechanism for feeding pre-formed blanks to a loading location. The lathe further includes an automatic workpiece handling device with a workpiece gripping mechanism pivotable about an axis perpendicular to said drum axis. The lathe additionally includes an automatic transfer apparatus equipped with at least two spaced apart workpiece clamping mechanisms, said apparatus having a first range of motion such that said clamping mechanisms are adapted to be moved parallel to said drum axis and a second range of motion such that the clamping mechanisms are adapted to be moved between said first operational spindle location, said loading location, and said automatic workpiece handling device. The lathe includes a tube cutting mechanism having a range of motion including an active position for engaging and cutting off an end portion of an elongate blank retained at one of said spindles. The lathe also includes an unloading mechanism for delivering a machined workpiece from one of said clamping means to outfeed a receiving mechanism.

According to another aspect of the invention, there is provided a workpiece machining process for producing a plurality of annular or tubular elements from an elongate tubular blank, including the steps of:

(a) providing at least one elongate tubular blank having a length calculated as a function of the number and length of the elements to be obtained therefrom;

(b) feeding said at least one tubular blank at a feeding station of a numerically controlled lathe having a single rotatable drum with at least two spindles;

(c) automatically transferring one said tubular blank from the feeding station and inserting said tubular blank in an axially elongate seat provided at a first spindle of the lathe;

(d) releasably securing said tubular blank in said seat leaving at least part of one surface of the tubular blank accessible to at least one turning tool of the lathe;

(e) automatically moving either of said first spindle and said turning tool relative to one another so as to bring said accessible tubular blank surface within reach of said turning tool;

(f) turning at least part of said accessible surface of the tubular blank;

(g) automatically extracting said tubular blank out of said seat by a length calculated as function of a length of an element to be obtained, leaving an outer portion of the tubular blank protruding from said seat, and automatically moving either of said first spindle and a tube cutting tool relative to one another so as to bring said tubular blank within reach of the cutting tool;

(h) automatically cutting said protruding portion off the tubular with the tube cutting tool, thereby obtaining the annular or tubular element;

(i) automatically removing said annular or tubular element from the first spindle;

(j) pivoting said annular or tubular element 180 degrees about an axis perpendicular to its longitudinal axis to a pivoted position and transferring the element to a second spindle of the lathe;

(k) releasably securing the element in said pivoted position to the second spindle leaving at least part of a surface of the element accessible to at least one turning tool of the lathe;

(l) turning at least part of said accessible surface of the element;

(m) automatically removing the element from the second spindle and delivering the element to an outfeed mechanism; and (n) cyclically repeating steps (e) to (m) until the last of the elements obtained from the tubular blank is finished.

In order that the present invention may be well understood, there will now be described a preferred embodiment thereof, given by way of example, reference being made to the accompanying drawings, in which:

DETAILED DESCRIPTION OF THE INVENTION

Figure 1:
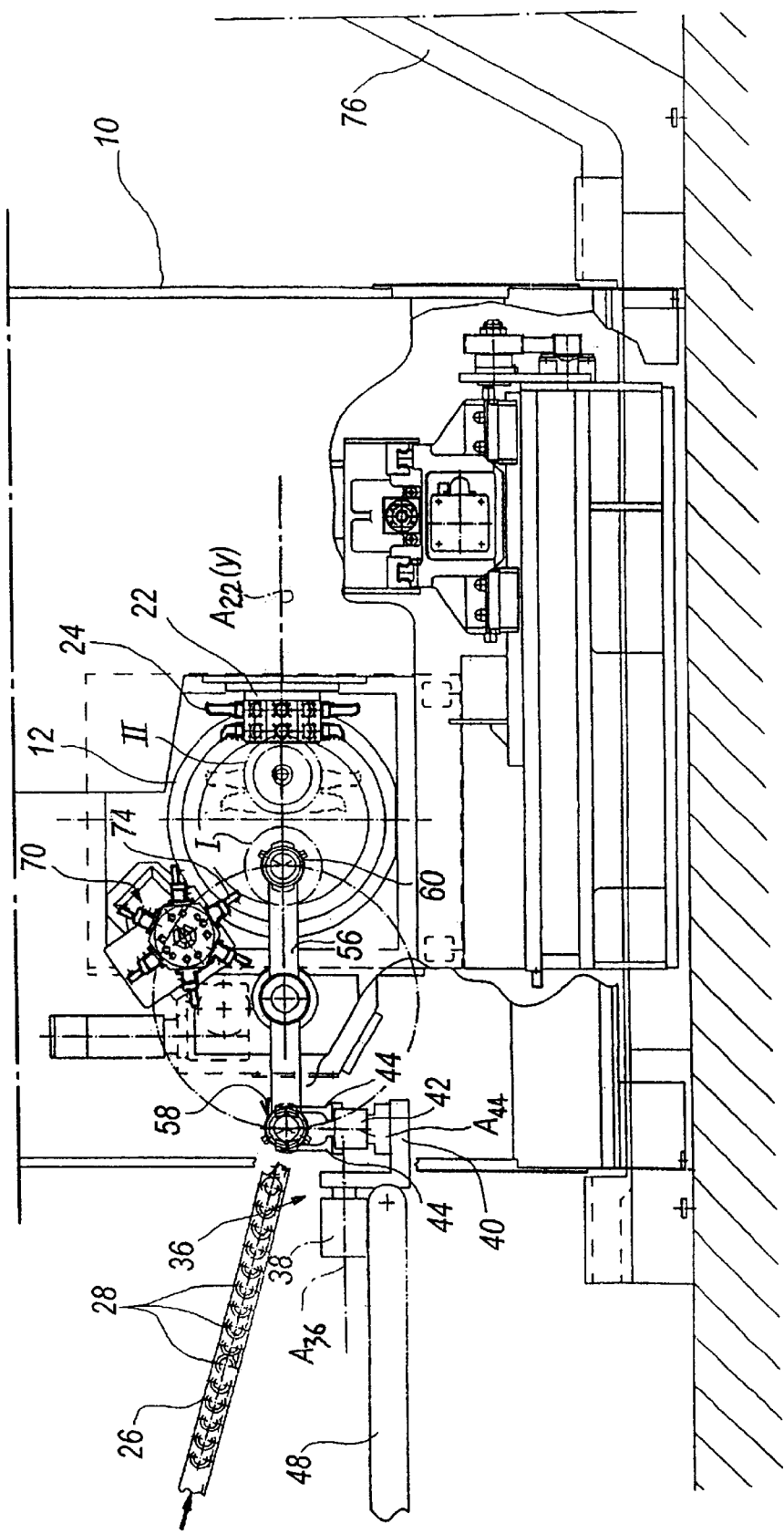
FIG. 1 is a front elevational view of a numerically controlled lathe according to the present invention.
Figure 2:
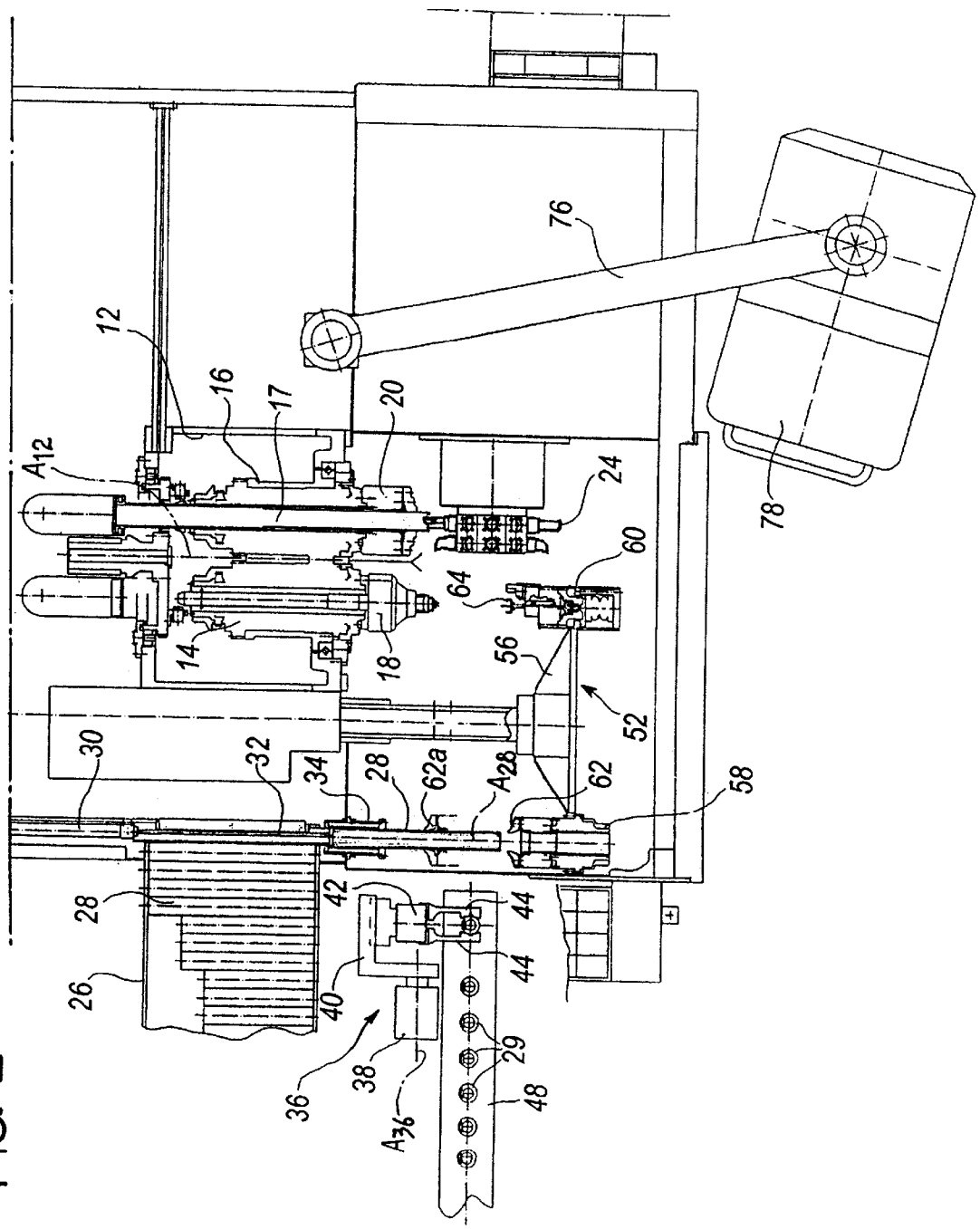
FIG. 2 is a top view of the lathe of FIG. 1 in a first step of a process in accordance with the present invention.

Referring initially to FIGS. 1 and 2, reference numeral 10 designates the protective housing of an automatic lathe. A twin-spindle drum 12 is rotatable about a horizontal axis $A_{12}$ and equipped, in this example, with two diametrically opposite revolving spindles 14, 16 having a first operational spindle location I (to the left in FIG. 1) and a second operational spindle location II (to the right). When the drum 12 is disposed in the operational arrangement of FIG. 1, the horizontal axes $A_I$ and $A_{II}$ of the spindles lie in a horizontal plane y encompassing the drum axis $A_{12}$. As shown in FIG. 2, in the present example a mandrel 18 is mounted to the spindle 14, whilst a chuck 20 is mounted to the spindle 16.

A dual toolholder turret 22 bearing a plurality of turning tools 24 is mounted for rotating about and sliding along a horizontal axis $A_{22}$ perpendicular to axis $A_{12}$ and lying in the plane y. The turret 22 is located proximate to the spindle location II, such that one or more of the turning tools 24 can be positioned in working relation to a workpiece held by the mandrel 18 or the chuck 20 when either of these is in spindle location II, as will be explained herein after. In the present example, the second spindle location II is exclusively a machining location, the first spindle location I being a handling and cutting location.

At one side of the protective housing 10, the lathe has a tube feeding station comprised of a sloping stock table 26 serving to receive and load several elongate tubes 28 parallel to the longitudinal axis $A_{12}$ of the drum 12. As used herein, the terms "longitudinal" and "transversal" should be interpreted with reference to the axis $A_{12}$ of the drum 12.

As shown in FIG. 2, at the beginning of each working cycle the leading one of tubes 28 is successively fed to a pusher device 30. The pusher device 30, preferably in the form of an hydraulic actuator, has a longitudinally extendible stem 32 that is actuated for pushing the leading tube through a fixed tubular feed guide 34 at a location that is herein termed loading/unloading position.

In close proximity to the feed guide 34, there is provided an automatic workpiece handling device 36 slidably driven along a transversal axis $A_{36}$. The handling device 36 comprises a motor 38 and an L-shaped supporting bracket 40 tiltable about the axis $A_{36}$. The bracket 40 supports a motor unit 42 designed for rotating a pair of gripping jaws 44 about a motor axis $A_{42}$ perpendicular to the axis $A_{36}$. The opening and closing movement of the jaws 44 in a direction transversal to that of axis $A_{42}$ is controlled either by a separate actuator (not shown) or by the same motor unit 42.

Figure 3:
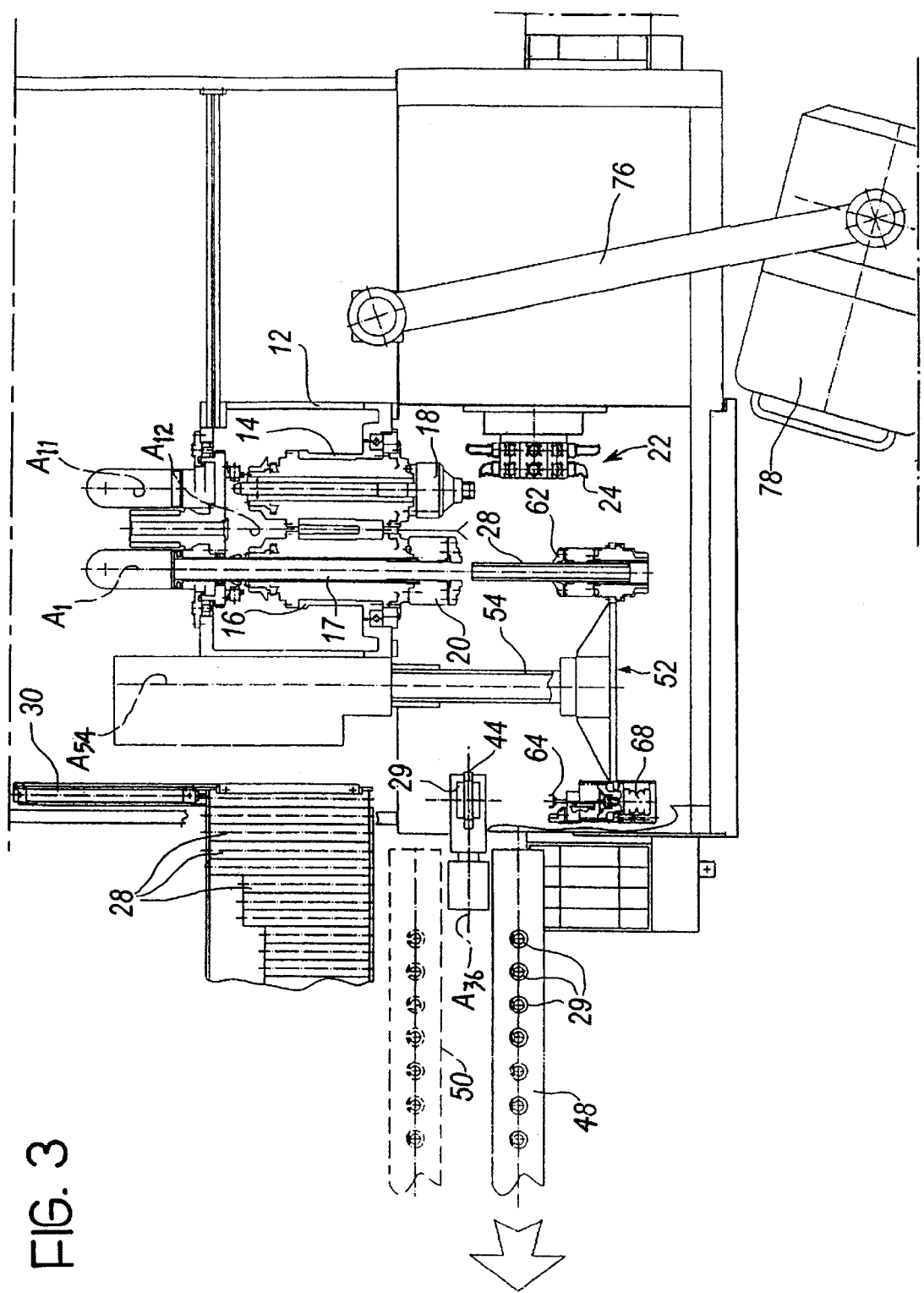
FIGS. 3 to 5 are top views of the lathe during further, successive steps of the process, respectively.

As will be discussed hereinafter, the handling device 36 can perform several operations, such as laying finished products 29 down on an outfeed conveyor 48, manipulate the workpieces in an intermediate transfer step during their processing, and function as a feeding device that picks up single pre-formed or forged blanks 31 from an optional blank infeed conveyor designated in phantom at 50 in FIG. 3.

At a location intermediate the feed guide 34 and the spindle location I, the automatic lathe comprises an automatic transfer apparatus, indicated overall at 52, for holding and transferring a workpiece between the chuck or mandrel temporarily located in spindle location I and the lateral position of tube feed guide 34 or the handling device 36, depending on the step being carried out.

The automatic transfer apparatus 52 comprises a longitudinal shaft 54 slidably movable in numerically controlled manner along its axis $A_{54}$, parallel to the axis $A_{12}$ of the drum 12. Mounted to the free end portion of shaft 54 is a transverse bar 56 pivotally mounted and driven for rotation about the shaft axis $A_{54}$.

First and second workpiece clamping heads 58, 60 are respectively fitted at each of the opposite ends of the bar 56. The heads 58, 60 are equally spaced from the shaft axis $A_{54}$ such that when the bar 56 is horizontal, the heads 58, 60 are respectively aligned with the axis $A_I$ of spindle location I and the opposite axis $A_{28}$ at the loading/unloading position.

Both clamping heads 58, 60 are provided with clamping devices 62, 64, respectively, for releasably gripping a workpiece during operation. Preferably, the clamping device 64 of the head 60 is associated with an actuator 68 for longitudinally extending and withdrawing the clamping device 64 with respect to the head 60.

Still referring to FIG. 1, a tube cutting device 70 is mounted on an inclined slide 72 near the spindle location I. The tube cutting device 70 bears a plurality of tube cutting tools 74, and is shiftable along the slide 72 between a lower, active position, in which at least one of the cutting tools 74 can engage a tube 28 held in the chuck 20 in spindle location I for cutting off an end portion of the tube (see FIG. 6), and a higher, passive position, in which the cutting tools do not interfere with the workpieces.

Fitted on a swinging arm 76 is a control panel 78 through which all the operations performed by the lathe can be programmed and controlled numerically.

In the following there is described an exemplary cycle of a process carried out by the automatic lathe in accordance with the present invention.

One or more stocks of tubes 28 of given length(s) are loaded on the sloping table 26. In accordance with an aspect of the present invention, the length of each stock of tubes is decided a priori as a function of the axial length of the ring elements that are to be obtained as finished or partly-finished products after being machined by the lathe.

In this context, the wording "ring element" is to be interpreted widely. As is well known, a numerically controlled lathe is an extremely versatile machine capable of carrying out a wide variety of operations and machining a workpiece to almost any shape being a solid of revolution. Therefore, it will be understood that the invention is equally applicable to other types of workpieces. For example, full bars of a given length could be processed instead of tubes with an aim to produce elements other than rings.

In the text below, in order to produce ring-shaped products each having an axial length of e.g. 9 mm, tubes cut to a length of 800 mm are loaded onto the feeding table 26. Therefore, assuming a tube cutting tool having a width of 1 mm is used, which will produce a 1 mm wide parting off at each cutting step, a single tube 28 will give 80 rings of 9 millimetres, according to the expression:

$$L_t = n \cdot [L_p + L_{po}] \quad (1)$$

wherein $L_t$=length of a tube n=number of pieces (rings) obtained from one tube $L_p$=length of one piece (ring)

$L_{po}$=length lost in the parting off.

800 mm (tube)=80·[9(ring)+1 (parting off)] mm.

In other words, the length of the tubes is chosen as a multiple of the length of the machined product, taking into account the parting off length for each ring being cut from the tube. In this manner, no waste will be left from the tubes.

Referring to FIG. 2, at the beginning of each working cycle the leading tube 28 comes into engagement with the pusher device 30. The transfer apparatus 52 is brought into a position such that the transversal bar 56 is oriented horizontal to bring the clamping device 62 in axial alignment with the tube feed guide 34, and the shaft 54 is somewhat retracted from the position illustrated in full line in FIG. 2 in order to bring the clamping device 62 closer to the feed guide 34, as depicted in dotted line at 62a. Then, the pusher device is actuated extending the stem 32 to push a tube 28 out of the feed guide 34, and have the tube grasped by the clamping device 62.

Preferably, the tube feeding station is equipped with a sensor device (not shown) for detecting the length of the incoming tubes. The sensor device provides a signal for controlling the operation of the pusher 30 such that the stem 32 is extended by a suitable length ensuring that the tube is grasped correctly by the clamping device 62.

Once the clamping device 62 has got hold of the tube, the shaft 54 is extended back to the position drawn in full line in FIG. 2. From here, the bar 56 of the transfer apparatus is pivoted 180 degrees about axis $A_{54}$, reaching the arrangement of FIG. 3, where the tube 28 is axially aligned with the chuck 20 at spindle location I. From this position, the shaft 54 is repeatedly retracted and advanced, opening and closing the jaws of the clamping device 62 each time so as to slip the tube 28 stepwise into the chuck 20 until the tube is almost fully inserted in an elongate seat 17 of the spindle 16. Whether full or only partial insertion is to be achieved depends on specific processing requirements. The depth of the insertion can be established automatically by programming the lathe accordingly.

Figure 4:
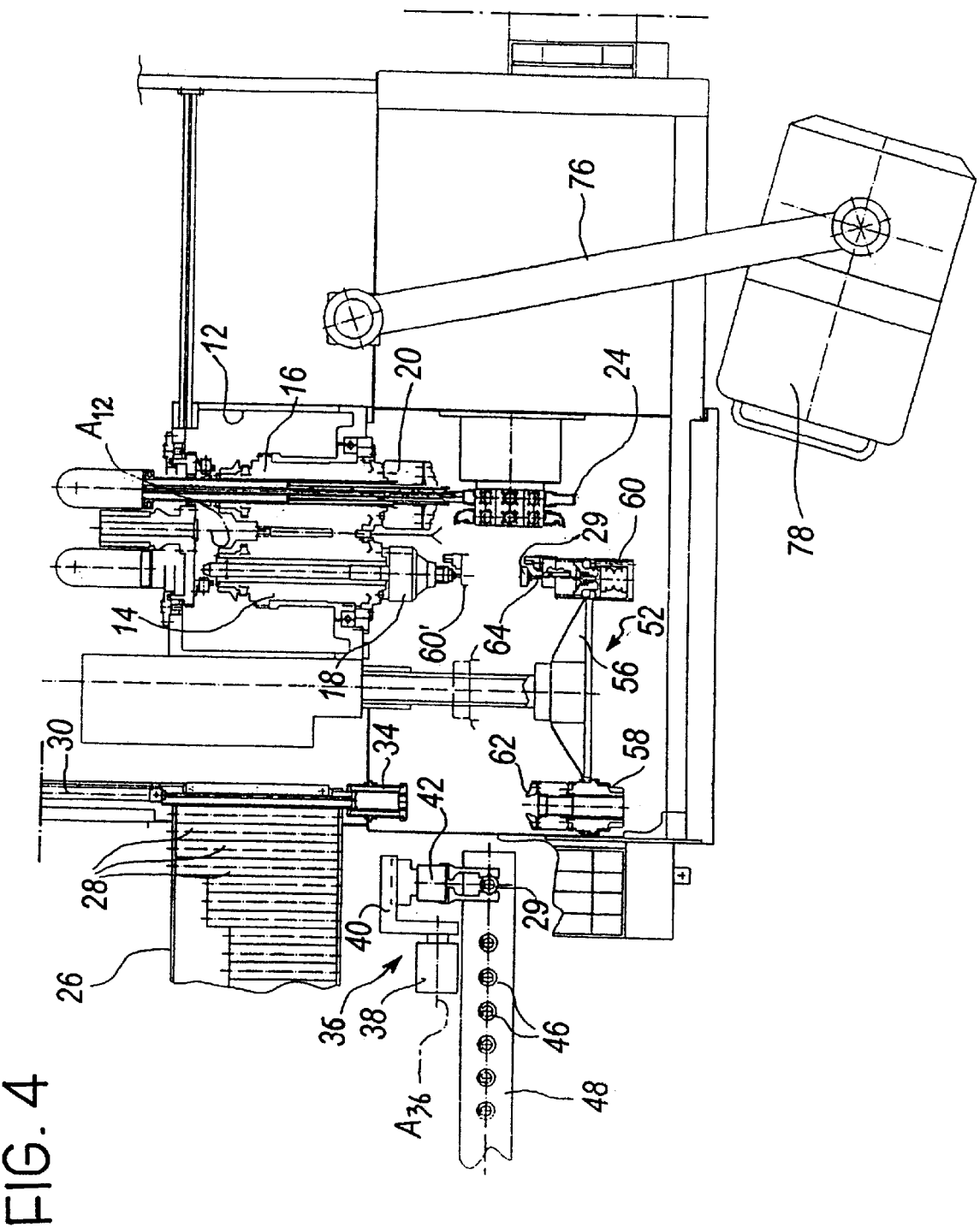

After the tube has been slipped into the chuck and the seat 17 as said, the drum 12 is rotated 180 degrees about drum axis $A_{12}$, bringing the chuck 20 in operational spindle location II. Here, the outer end of the tube 28 and the axially outer length of the inner cylindrical surface of the tube can be reached by one or more of the turning tools 24 and turned to the desired shape (FIG. 4).

Upon completion of this first turning operation, the drum 12 is rotated 180 degrees again to bring the chuck 20 with the tube 28 back to spindle location I. The shaft 54 is first retracted so as to allow the jaws of the clamping device 62 to grasp the already machined outer end of the tube 28 and then, after releasing the jaws of the chuck 20, the shaft is advanced longitudinally by a pre-set distance dependent on the length of the ring element to be obtained through the machining process. Particularly, such pre-set distance corresponds to the length of the ring element plus the parting off length corresponding to the longitudinal thickness of the tube cutting tool 74.

Figure 6:
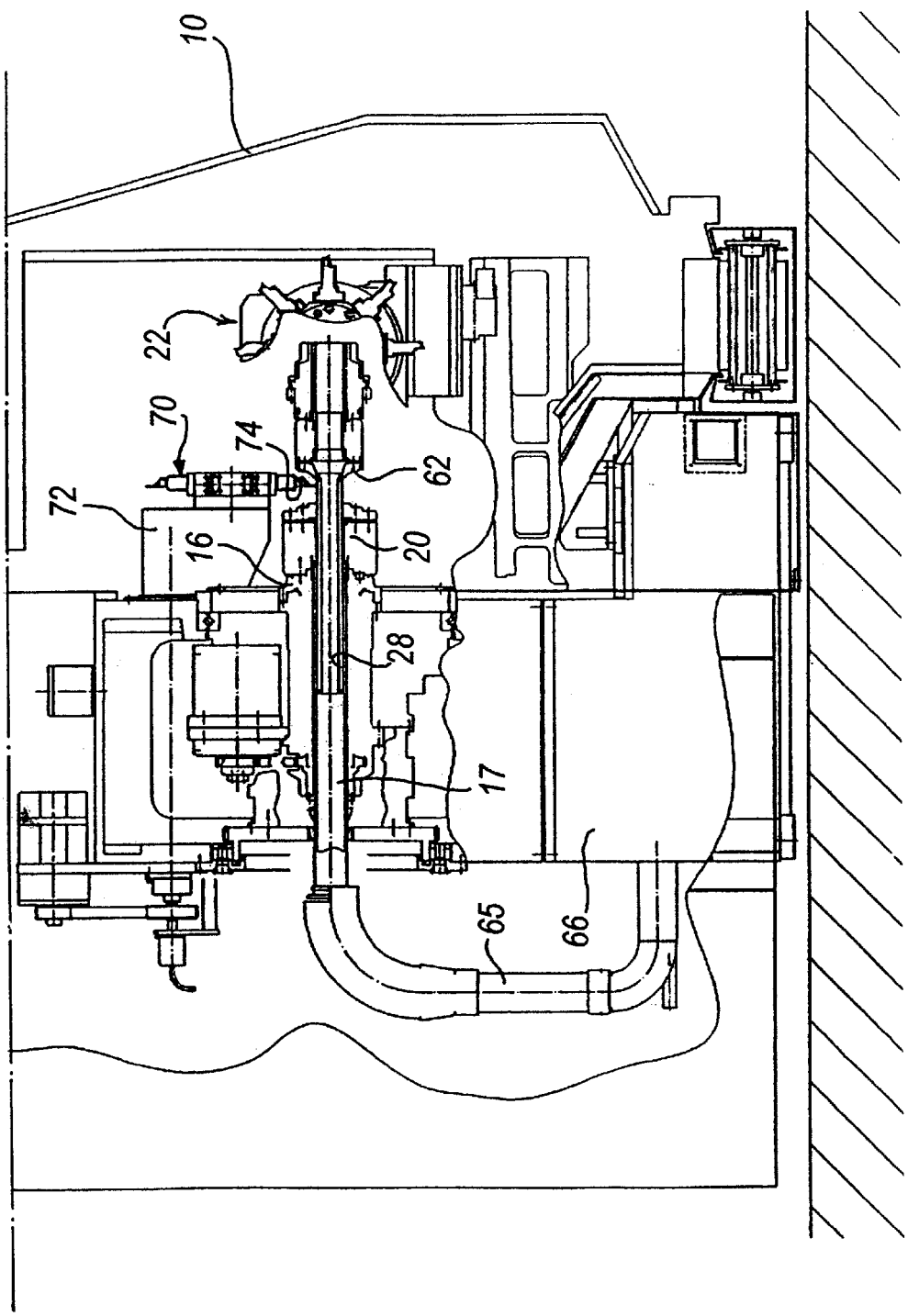
FIG. 6 is a side elevational view of the lathe of FIG. 1 during a tube cutting step.

As shown in FIG. 6, the tube cutting device 70 is lowered along the inclined slide 72 to cut the machined, outermost portion off the remainder of the tube 28 by means of a tube cutting tool 74. Such cutting step is performed with the jaws of the clamping device 62 still gripping the end of the tube, so that when the end portion of the tube is cut out into a ring element 29, the latter is retained by said clamping device.

Figure 5:
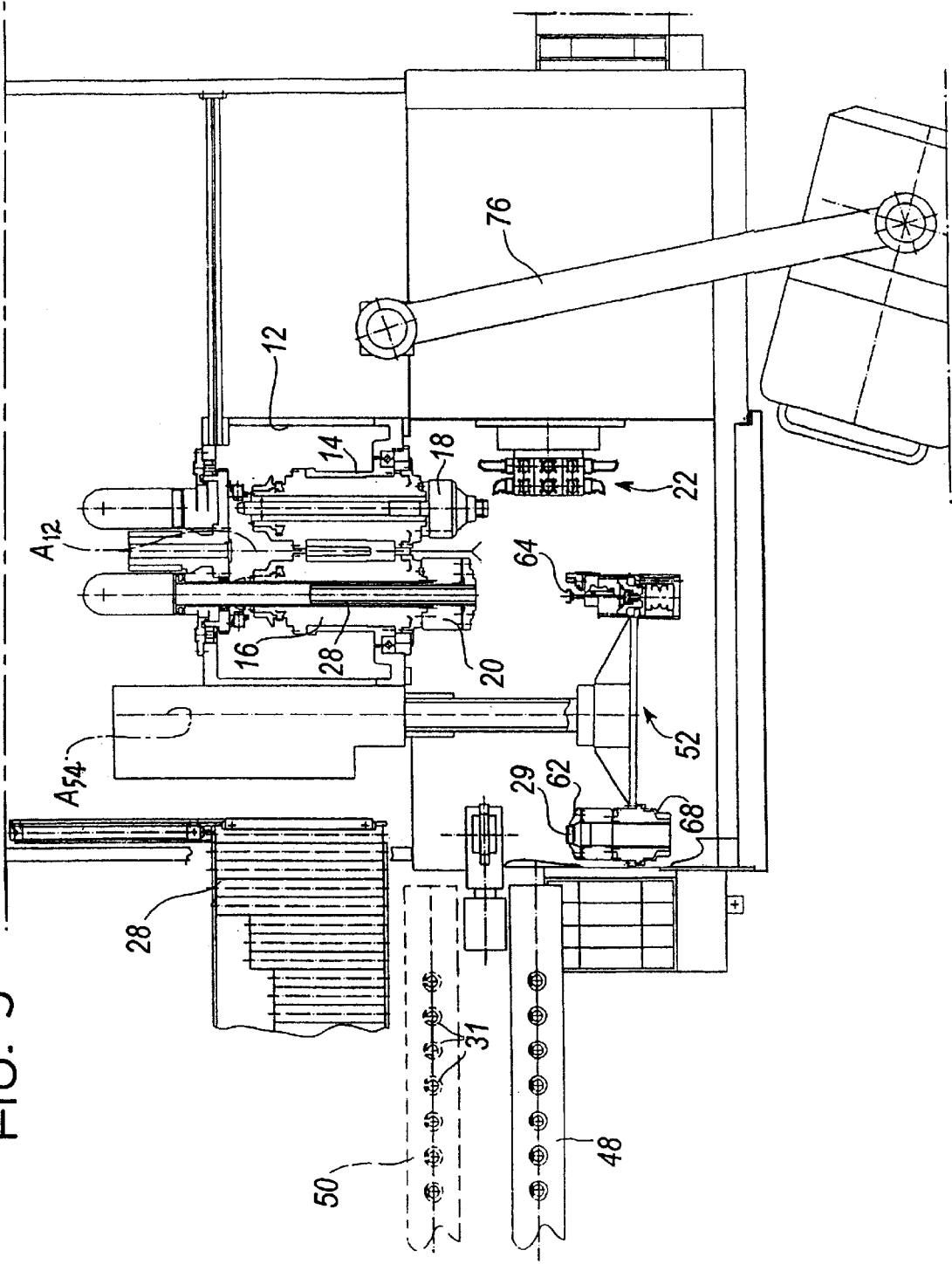

Successively, the shaft 54 is advanced to remove the ring from the chuck. The bar 56 is pivoted 180 degrees about the axis $A_{54}$ to bring the ring 29 in axial alignment with the jaws 44 of the handling device 36, which in the meantime has been shifted transversally (to the right in FIG. 5) so as to align the jaws 44 with the feed guide 34 at the loading/ unloading position. The shaft 54 is retracted again, bringing the ring 29 near the jaws 44. The jaws 44 can then take the ring as shown in FIG. 1, pivot 180 degrees about the axis $A_{42}$—now vertical—so as to reverse the ring in a horizontal plane.

At this point, the bar 56 is pivoted 180 degrees to bring the head 60 in alignment with the jaws 44, such that the gripping device 64 of head 60 can take the ring 29 from the jaws 44. From here, the bar 56 pivots other 180 degrees about axis $A_{54}$, reaching the arrangement shown in FIG. 5. The ring 29 is axially aligned with spindle location I, where the mandrel 18 is now present as the drum 12 has in the meantime been rotated 180 degrees. Then, the shaft 54 is retracted to the extent that the head 60 can reach the position indicated 60a and fit the ring 29 onto the mandrel 18. In order to perform the operation (not illustrated) of turning the outer cylindrical surface of the ring 29 and its end face where the cutting was carried out, the drum 12 has to be rotated to bring the mandrel 18 into spindle location II, where the ring is engaged by one or selected ones of turning tools 24.

After this second turning operation has been completed, the drum 12 is rotated 180 degrees once again to bring the mandrel 18 back to spindle location I, from where the ring 29 can be passed firstly to the gripping means 64 and, after pivoting the bar 56 once again, fed to the automatic handling device 36 at the loading/unloading position. Finally, the automatic handling device 36 lays the finished or partly-finished ring onto the outfeed conveyor 48.

The above sequence of operations is repeated until the last ring element 29 of the tube is machined, after which a new tube 28 is fed by the pusher device 30 and a new machining cycle is performed.

In a preferred embodiment of the present invention, the lathe is adapted to work with ultra high pressurised coolant, injected at the toolholder turret 22 with a pressure ranging between 200 and 400 bars. The pressurised liquid is effective both in cooling the turning tools and in removing the chips, besides co-operating to break the chips off the workpiece. This option turns out to be particularly advantageous when performing the turning of the inner bore of the tube. As known, owing to the centrifugal force, the chips tend to stay adherent to the surface of the inner bore and, consequently, are likely to interfere with the turning tools and accelerate their wear.

As illustrated schematically in FIGS. 4 and 6, the coolant is forced to flow through the inner bore of the tube 28 removing the chips therefrom, and through the spindle 16 and a conduit 65 connecting the spindle to a lower reservoir 66.

As will be apparent to those skilled in the art, the lathe can handle two workpieces simultaneously, their working cycles being partly overlapping. While the tube 28 undergoes the first turning step (e.g. internal turning) with the chuck 20 at spindle location II, in the mask time the automatic transfer apparatus 52 and the handling device 36 are operated to reverse a ring 29 that was cut off the tube 28 in a previous step and fit it on the mandrel 18. Then, in rotating the drum 12 to bring the chuck 20 into spindle location I, the mandrel 18 (fitted with the previously cut ring 29) reaches spindle location II. Simultaneously as a new ring portion is being cut off of the tube 28 at spindle location I, the other ring 29 is subjected to the second turning operation (e.g. external turning) at spindle location II.

Figure 7:
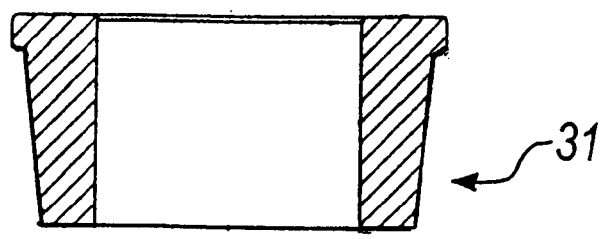
FIGS. 7 to 9 are axial sectional views, to an enlarged scale, of exemplary forged blanks that can be machined by the lathe according to the present invention.
Figure 8:
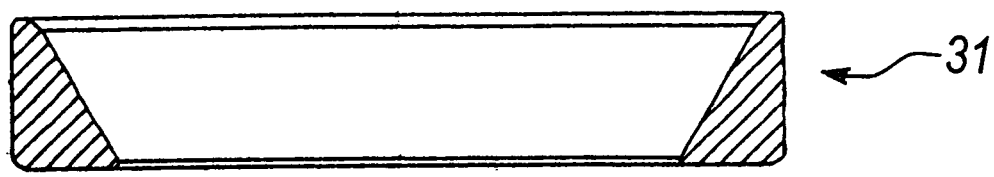
Figure 9:
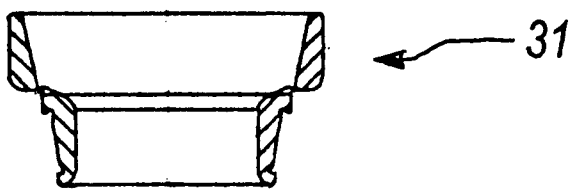

It should be noted that, although the drawings of FIGS. 2 to 6 illustrate the lathe performing a process of machining and cutting off annular elements from a tube 28, the lathe of the present invention can equally serve to machine series of single pre-formed blanks 31, for example forged blanks or even, less preferably, ring-shaped blank elements pre-cut from an elongate tube in a conventional manner. Examples of forged blanks that can be machined in accordance with the present invention are designated at 31 in FIGS. 7 to 9.

Owing to the numerical control system, the lathe can be easily reset to process blanks having variable shapes and sizes, by simply inputting from time to time a numerical code of each article.

From the foregoing it will be apparent that the process and the lathe of the present invention, besides overcoming the drawbacks discussed in the introductory part of the description, also allow to attain the following advantages:

a) The incidence of cutting costs is considerably reduced as compared with prior art methods wherein a lathe is fed with single blanks cut off from a tube. According to the present invention, each tube 28 (which will give a plurality of ring pieces 29) needs to be cut only once, to a pre-set length as discussed above, prior to being fed to the lathe.

b) Tubes with a length calculated according to the above mentioned expression (1), i.e. being a multiple of the length of the final products (plus the parting off length) allow to avoid waste of the tube material.

c) Infeed tubes ranging between 600 and 800 millimetres in length are ideal for transportation in stocks on the so-called "European" standard size pallets. Therefore, the same pallets used for handling the finished products can advantageously be exploited also for the tube stocks. Further, tubes having a length within the above mentioned range are free of vibration problems when spinning at high revolving speed.

d) The numerical control, besides allowing to machine workpieces to any desired form, provides easy and simple resetting from the tube infeed mode to the blank infeed mode of operation and vice versa. The lathe is capable of working indifferently high, medium or low volume productions.

e) Very low loading and unloading time is achieved by means of the infeed system and the automatic transfer apparatus, thereby allowing an increased rate of production.

f) The lathe and the process according to the present invention are ideal for machining annular elements with outer diameters from about 30 to about 160 mm, which covers the range of most inner and outer races for bearing assemblies.

g) Finally, the use of high pressurised coolant increases efficiency as the lathe must not be stopped to remove chips that hinder the operation of the turning tools. The absence of chips interfering with the tools is beneficial in that it prolongs the life of the tools, in addition to reducing the number of stops for replacing them when worn out. Furthermore, instantaneous removal of chips allows to increase the rotational speed of the spindle and, consequently, the production rate.

While a specific embodiment of the invention has been disclosed, it is to be understood that such disclosure has been merely for the purpose of illustration and that the invention is not to be limited in any manner thereby. Various modifications will be apparent to those skilled in the art in view of the foregoing example. Particularly, unlike the arrangement illustrated in FIGS. 2 to 6, the lathe can be equipped, for example, with a supplementary toolholder turret mounted on a supplementary slide in order to perform turning (or other operations) also at the first spindle location, depending on manufacturing requirements.

Also, according to requirements, instead of being a twin-spindle drum as discussed and illustrated herein, the drum of the lathe could be equipped with three or more spindles arranged in a circle around the axis of rotation of the drum. Or, the spindles could be arranged differently, for example with vertically aligned operational locations. However, the arrangement illustrated in FIG. 1 is preferred as it allows to place the tube cutting device 70 in a convenient position.

What is claimed is:

1. A numerically controlled lathe including:

a single drum having at least two spindles, the drum being rotatably mounted about a drum axis for selectively moving said spindles between at least a first operational spindle location and a second operational spindle location;

at least one toolholder turret with at least one turning tool positionable in working relation to a workpiece retained at one of said spindles at one of said first and second spindle locations;

a workpiece feeding station at one side of the lathe, equipped with a first mechanism for feeding elongate blanks in form of tubes or bars and a second mechanism for feeding pre-formed blanks to a location for loading and unloading;

an automatic workpiece handling device with a workpiece gripping mechanism pivotable about an axis perpendicular to said drum axis;

an automatic transfer apparatus equipped with at least two spaced apart workpiece clamping mechanisms, said apparatus having a first range of motion such that said clamping mechanisms are adapted to be moved parallel to said drum axis and a second range of motion such that the clamping mechanisms are adapted to be moved between said first operational spindle location, said location for loading and unloading, and said automatic workpiece handling device;

a tube cutting mechanism having a range of motion including an active position for engaging and cutting off an end portion of an elongate blank retained at one of said spindles; and an unloading mechanism for delivering a machined workpiece from one of said clamping mechanisms to outfeed a receiving mechanism.

2. A lathe according to claim 1, wherein said automatic workpiece handling device, said unloading mechanism, and said second mechanism for feeding pre-formed blanks are provided by a single automatic apparatus.

3. A lathe according to claim 1, wherein the active position of said cutting device is at one of said operational spindle locations.

4. A lathe according to claim 1, wherein said automatic transfer apparatus includes:
   a longitudinal shaft slidably movable in numerically controlled manner along an axis parallel to said drum axis;
   a transverse bar pivotally mounted to said shaft and driven for rotation about said shaft axis, said bar having opposite ends; and
   said first and second workpiece clamping mechanisms respectively fitted at each of the opposite ends of said bar.

5. A lathe according to claim 4, wherein said clamping mechanisms are equally spaced from said shaft axis.

6. A lathe according to claim 5, wherein said bar has a position in which said clamping mechanisms are respectively aligned with said first operational spindle location and said location for loading and unloading.

7. A lathe according to claim 4, wherein at least one of said clamping mechanisms is associated with an actuator mechanism for translating said clamping mechanism perpendicularly to the transverse bar.

8. A lathe according to claim 1, wherein said automatic workpiece handling device includes:
   a supporting member slidably driven along and pivotally driven about an axis transversal to the drum axis;
   a workpiece gripping mechanism mounted on said supporting member and pivotally driven about an axis perpendicular to said transversal axis; and
   an actuator mechanism for controlling the opening and closing movement of the gripping mechanism in a direction transversal to that of said transversal axis.

9. A lathe according to claim 1, wherein said first mechanism for feeding elongate blanks is comprised of a sloping stock table for receiving and loading a plurality of elongate tube blanks parallel to said drum axis.

10. A lathe according to claim 9, wherein said first mechanism for feeding elongate blanks is associated with a pusher actuator device for pushing the lowermost of said tube blanks on said sloping table along a feed guide at said location for loading and unloading.

11. A lathe according to claim 1, wherein an infeed conveyor mechanism for feeding pre-formed blanks is provided at a location proximate to the outfeed receiving mechanism and the first mechanism for feeding elongate blanks.

12. A lathe according to claim 1, wherein at least one of said spindles is provided with an elongate seat for accommodating therein one of said tubular blanks.

13. A lathe according to claim 1, comprising a mechanism for injecting high pressurised coolant at toolholder turret.

14. A lathe according to claim 13, further comprising a channel mechanism for connecting a seat passing through at least on of said spindles to a reservoir.

15. A machining process for producing a plurality of annular or tubular elements from an elongate tubular blank, the process comprising the steps of:
   (a) providing at least one elongate tubular blank having a length calculated as a function of the number and length of the elements to be obtained therefrom;
   (b) feeding said at least on tubular blank at a feeding station of a numerically controlled lathe having a single rotatable drum with at least two spindles;
   (c) automatically transferring one said tubular blank from the feeding station and inserting said tubular blank in an axially elongate seat provided at a first spindle of the lathe;
   (d) releasably securing said tubular blank in said seat leaving at least part of one surface of the tubular blank accessible to at least one turning tool of the lathe;
   (e) automatically moving either of said first spindle and said turning tool relative to one another so as to bring said accessible tubular blank surface within reach of said turning tool;
   (f) turning at least part of said accessible surface of the tubular blank;
   (g) automatically extracting said tubular blank out of said seat by a length calculated as a function of a length of an element to be obtained, leaving an outer portion of the tubular blank protruding from said seat, and automatically moving either of said first spindle and a tube cutting tool relative to one another so as to bring said tubular blank within reach of the cutting tool;
   (h) automatically cutting said protruding portion off the tubular with the tube cutting tool, thereby obtaining the annular or tubular element;
   (i) automatically removing said annular or tubular element from the first spindle;
   (j) pivoting said annular or tubular element 180 degrees about an axis perpendicular to its longitudinal axis to a pivoted position and transferring the element to a second spindle of the lathe;
   (k) releasably securing the element in said pivoted position to the second spindle leaving at least part of a surface of the element accessible to at least one turning tool of the lathe;
   (l) turning at least part of said accessible surface of the element;
   (m) automatically removing the element from the second spindle and delivering the element to an outfeed mechanism; and
   (n) cyclically repeating steps (e) to (m) until the last of the elements obtained from the tubular blank is finished.

16. A process according to claim 15, wherein the length of the tubular blank is chosen as a multiple of the length of the elements to be obtained therefrom, taking into account the parting off length for each element being cut from the tubular blank at step (h).

17. A process according to claim 15, wherein the length of the tubular blank ranges between about 600 mm and about 800 mm.

18. A process according to claim 15, wherein said cutting step (h) comprises the step of:
   (h1) holding said protruding portion of the tubular blank with a rotary head of an automatic apparatus for transferring said blanks and said elements between different locations of the lathe.

* * * * *